(12) United States Patent
Irikuchi (10) Patent No.: US 7,382,812 B2
(45) Date of Patent: Jun. 3, 2008

(54) SOLID STATE LASER DEVICE (75) Inventor: Satoshi Irikuchi, Atsuhi (JP)

(73) Assignee: Shimadzu Corporation, Kyoto-shi (JP)

( * ) Notice: Subject to any disclaimer, the term of this patent is extended or adjusted under 35 U.S.C. 154(b) by 51 days.

(21) Appl. No.: 11/250,846

(22) Filed: Oct. 14, 2005

(65) Prior Publication Data

US 2006/0227819 A1    Oct. 12, 2006

(30) Foreign Application Priority Data

Apr. 12, 2005  (JP) .............................. 2005-114045

(51) Int. Cl.
*H01S 3/10* (2006.01)
(52) U.S. Cl. .............................. 372/21; 372/98; 372/99; 372/107; 372/108
(58) Field of Classification Search .................. 372/19, 372/21, 98, 20, 9, 107
See application file for complete search history.

(56) References Cited

U.S. PATENT DOCUMENTS

| 5,502,738 A | * | 3/1996 | Hyuga | 372/21 |
| 5,506,860 A | * | 4/1996 | Hyuga et al. | 372/98 |
| 5,657,341 A | * | 8/1997 | Hyuga | 372/98 |
| 5,768,304 A | * | 6/1998 | Goto | 372/98 |
| 6,028,869 A | * | 2/2000 | Harada et al. | 372/19 |
| 6,130,900 A | * | 10/2000 | Black et al. | 372/25 |
| 6,584,129 B2 | * | 6/2003 | Hyuga et al. | 372/39 |
| 6,665,321 B1 | * | 12/2003 | Sochava et al. | 372/20 |
| 6,763,047 B2 | * | 7/2004 | Daiber et al. | 372/34 |
| 2003/0146189 A1 | | 8/2003 | Tateno et al. | |

* cited by examiner

*Primary Examiner*—Minsun Oh Harvey
*Assistant Examiner*—Yuanda Zhang
(74) *Attorney, Agent, or Firm*—Rankin, Hill & Clark LLP (57) ABSTRACT

The transmittance of an etalon relative to an oscillating line having the wavelength of 1061.6 to 1062.2 nm by an Nd:YAG laser medium 3 is set to 0.9 or lower (the maximum value of the transmittance is 1.0). The oscillating line of the wavelength of 1061.6 to 1062.6 nm is damped by the etalon so that a peak corresponding thereto does not substantially appear in an outputted laser beam. Accordingly, a longitudinal mode can be preferably changed to a single mode and an output can be stabilized.

4 Claims, 6 Drawing Sheets

SOLID STATE LASER DEVICE

The present application claims foreign priority under 35 USC 119 based on Japanese Patent Application No. 2005-114045, filed Apr. 12, 2005, the content of which is incorporated herein by reference.

BACKGROUND OF THE INVENTION

1. Technical Field

The present invention relates to a solid state laser device and a method for producing a solid state laser device, and more particularly to a solid state laser device and a method for producing a solid state laser device in which a longitudinal mode can be preferably changed to a single mode by an etalon.

2. Related Art

A solid state laser device has been known that comprises a laser diode, an Nd:YAG laser medium, a non-linear optical element, an etalon and an output mirror (for instance, see U.S. Pat. No. 5,506,860). The laser diode outputs an excited laser beam. The Nd:YAG laser medium is excited by the excited laser beam to induce and emit a fundamental wave. The non-linear optical element converts the fundamental wave to a higher harmonic wave. The etalon changes a longitudinal mode to a single mode. The output mirror forms one end of an optical resonator and transmits the outputted laser beam.

Figure 3:
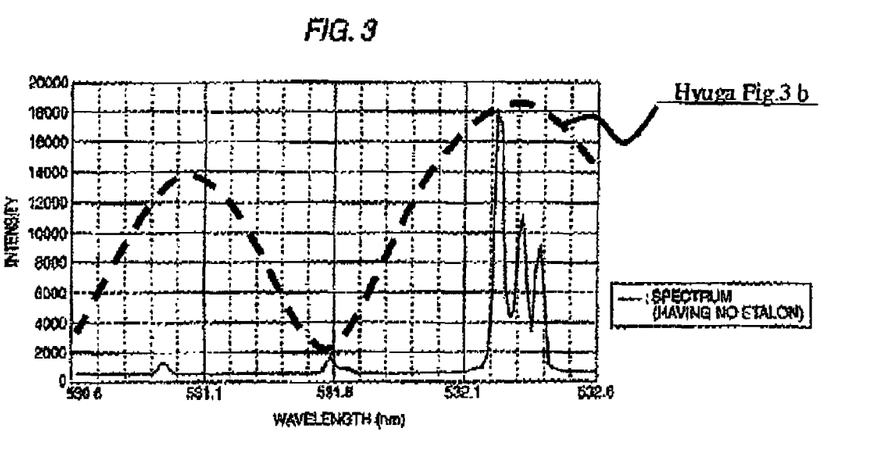
FIG. 3 is a graphical diagram showing a spectrum of an outputted laser beam in a structure having the etalon removed in the first embodiment.

When an etalon is not inserted into an optical resonator, for instance, as shown in FIG. 3, the spectrum of an outputted laser beam has a secondary oscillating line having the wavelength of 530.8 to 531.1 nm (represented by the wavelength of a fundamental wave, and refer it to as an oscillating line of the wavelength of 1061.6 to 1062.2 nm, hereinafter) or a secondary oscillating line having the wavelength of 531.4 to 531.8 nm (this is an oscillating line of a sum frequency of the previous oscillating line and the fundamental wave has no component thereof) as well as a main oscillating line having the wavelength of 532.1 to 532.6 nm (represented by the wavelength of the fundamental wave and refer it to as an oscillating line of the wavelength of 1064.2 to 1065.2 nm, hereinafter).

Figure 4:
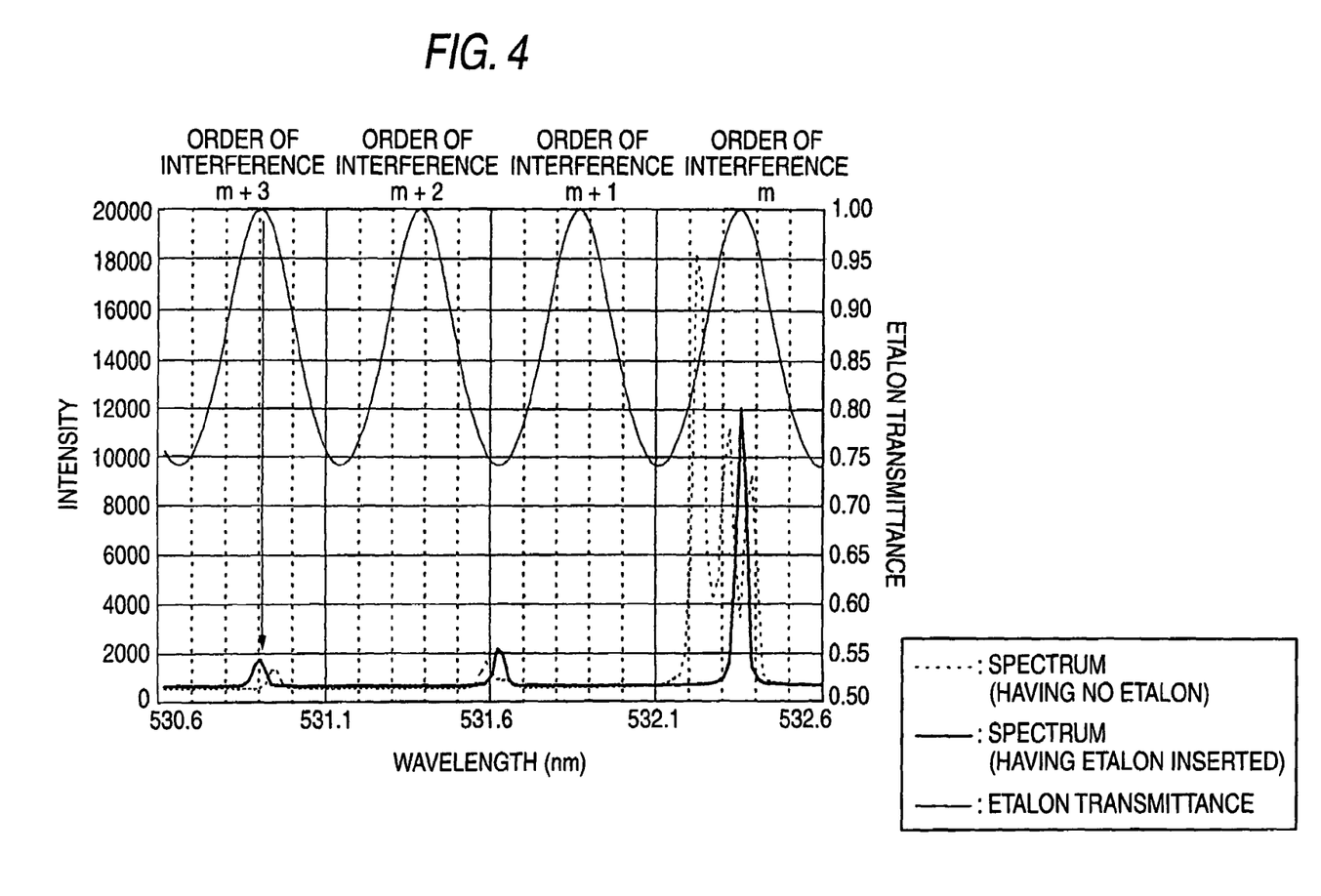
FIG. 4 is a graphical diagram showing the transmitting characteristics of the etalon and the spectrum of the outputted laser beam in a structure into which the etalon before the optimizing process is inserted in the first embodiment.

When the etalon is inserted into the optical resonator, for instance, as shown by a thin full line in FIG. 4, the transmitting characteristics of the etalon exhibit a sine wave form and the maximum transmittance peak thereof corresponds to the main oscillating line having the wavelength of 1064.2 to 1065.2 nm and a longitudinal mode is changed to a single mode. That is, a spectrum "having no etalon" shown by a thin broken line in FIG. 4 is changed to a spectrum "having an etalon inserted" shown by a thick full line in FIG. 4.

However, as shown in FIG. 4, assuming that the order of interference of the maximum transmittance peak corresponding to the main oscillating line having the wavelength of 1064.2 to 1065.2 nm is m, when one of other maximum transmittance peaks corresponds to the secondary oscillating line having the wavelength of 1061.6 to 1062.2 nm (in FIG. 4, the maximum transmittance peak of the order of interference of m+3 corresponds to the secondary oscillating line), a secondary peak appears having the wavelength of 530.8 to 531.1 nm also in the outputted laser beam, and further, a secondary peak having the wavelength of 531.4 to 531.8 nm appears in the outputted laser beam.

However, since the longitudinal mode is not changed to the single mode under this state, an output is undesirably unstable due to the competition of modes.

SUMMARY OF THE INVENTION

Thus, it is an object of the present invention to provide a solid state laser device and a method for producing a solid state laser device in which a longitudinal mode can be preferably changed to a signal mode by an etalon.

According to a first aspect, the present invention provides a solid state laser device comprising: a laser diode for outputting an excited laser beam; an Nd:YAG laser medium excited by the excited laser beam to induce and emit a fundamental wave; a non-linear optical element for converting the fundamental wave to a higher harmonic wave; an etalon for changing a longitudinal mode to a single mode; and an output mirror forming one end of an optical resonator and transmitting the outputted laser beam, characterized in that the transmittance of the etalon relative to an oscillating line of the wavelength of 1061.6 to 1062.2 nm by the Nd:YAG medium is 0.9 or lower.

The "transmittance of the etalon" is represented by a relative value when the maximum value of the transmittance is 1.0.

In the solid state laser device according to the first aspect, since the transmittance of the etalon relative to the oscillating line having the wavelength of 1061.6 to 1062.2 nm by the Nd:YAG medium is 0.9 or lower, the oscillating line having the wavelength of 1061.6 to 1062.2 nm is damped by the etalon so that a peak corresponding thereto does not substantially appear in the outputted laser beam. Accordingly the longitudinal mode can be preferably changed to the single mode and an output can be stabilized.

According to a second aspect, the present invention provides a producing method for a solid state laser device including a laser diode for outputting an excited laser beam; an Nd:YAG laser medium excited by the excited laser beam to induce and emit a fundamental wave; a non-linear optical element for converting the fundamental wave to a higher harmonic wave; an etalon for changing a longitudinal mode to a single mode; and an output mirror forming one end of an optical resonator and transmitting the outputted laser beam. The producing method for a solid state laser device comprises the steps of: observing the outputted laser beam of the solid state laser device to measure a central wavelength $\lambda 1$ of an oscillating line having the wavelength of 1064.2 to 1065.2 nm by the Nd:YAG laser medium; observing the outputted laser beam of the solid state laser device having the etalon removed to measure a central wavelength $\lambda 0$ of an oscillating line having the wavelength of 1064.2 to 1065.2 nm by the Nd:YAG laser medium; obtaining a corrected optical path length $\Delta$ of the etalon so that the transmittance of the etalon relative to an oscillating line having the wavelength of 1061.6 to 1062.2 nm by the Nd:YAG laser medium is 0.9 or lower on the basis of the $\lambda 0$ and $\lambda 1$; and correcting the optical path of the etalon by the corrected optical path length $\Delta$.

In the producing method for a solid state laser device according to the second aspect, the outputted laser beam of the solid state laser device having the etalon removed is observed to actually measure the central wavelength $\lambda 0$ of the oscillating line having the wavelength of 1064.2 to 1065.2 nm. The outputted laser beam of the solid state laser device into which the etalon is inserted is observed to actually measure the central wavelength $\lambda 1$ of the oscillating line having the wavelength of 1064.2 to 1065.2 nm. Thus, the corrected optical path length $\Delta$ for changing the transmitting characteristics of the etalon is obtained so that the transmittance of the etalon relative to the oscillating line having the wavelength of 1061.6 to 1062.2 nm is 0.9 or lower on the basis of the obtained results. Then, the optical path of the etalon is corrected by the corrected optical path length Δ. Accordingly, the maximum transmittance peak of the etalon after the correction does not correspond to a secondary oscillating line having the wavelength of 1061.6 to 1062.2 nm, so that the oscillating line having the wavelength of 1061.6 to 1062.2 nm is damped by the etalon and a peak corresponding thereto does not substantially appear in the outputted laser beam. Therefore, the solid state laser device that can preferably change the longitudinal mode to the single mode can be produced.

A corrected optical path length Δ is most preferably obtained so that the minimum transmittance peak of the etalon corresponds to the oscillating line of the wavelength of 1061.6 to 1062.2 nm.

According to a third aspect, the present invention provides a producing method for a solid state laser device according to the second aspect, characterized in that assuming that an order of interference of the etalon relative to the fundamental wave of the oscillating line having the wavelength of 1064.2 to 1065.2 nm by the Nd:YAG laser medium is m and an integer not smaller than 0 and not larger than 3 is k, the corrected optical path length Δ is obtained so that the oscillating line having the wavelength of 1061.6 to 1062.2 nm by the Nd:YAG laser medium is located within a range having the transmittance not larger than 0.9 between the maximum transmittance peak of the order of interference of m+k of the etalon and the maximum transmittance peak of the order of interference of m+k+1.

Since when the etalon is inserted into the optical resonator, the transmitting characteristics of the etalon show a sine wave form, assuming that k is an integer, the corrected optical path length Δ is obtained so that the oscillating line having the wavelength of 1061.6 to 1062.2 nm by the Nd:YAG laser medium is located within a range having the transmittance not larger than 0.9 between the maximum transmittance peak of the order of interference of m+k of the etalon and the maximum transmittance peak of the order of interference of m+k+1.

However, when k is a negative number, the corrected optical path length Δ increases an optical path length, so that a practice is difficult (a practice may be made). When k is 0 or higher, the corrected optical path length Δ decreases an optical path length, so that a practice can be easily made by employing a technique disclosed in, for instance, US2003/0146189A1. However, when k is 4 or larger, a part between the maximum transmittance peak of the order of interference m and the maximum transmittance peak of the order of interference m±1 is too narrow. Thus, a multi-mode may be possibly formed by the fundamental wave of the oscillating line having the wavelength of 1064.2 to 1065.2 nm.

Thus, in the producing method for a solid state laser device according to the third aspect, k is set to a value not smaller than 0 and not larger than 3. Accordingly, the optical path length can be easily corrected and the longitudinal mode can be preferably changed to the single mode.

According to the solid state laser device and the producing method for a solid state laser device of the present invention, the longitudinal mode can be preferably changed to the single mode and an output can be stabilized.

DETAILED DESCRIPTION OF THE INVENTION

The present invention will be described in more detail by way of embodiments shown in the drawings. It is to be understood that the present invention is not limited thereto.

First Embodiment

Figure 1:
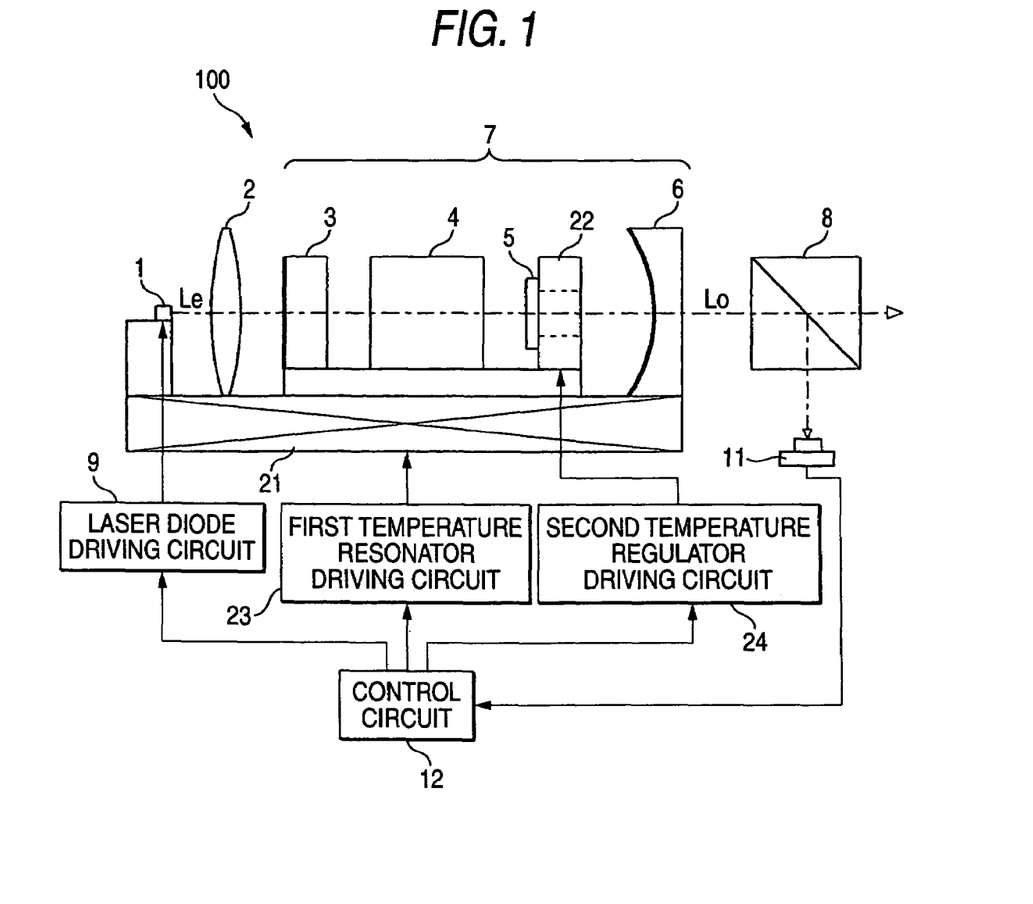
FIG. 1 is a structural explanatory view showing a solid state laser device according to a first embodiment.

FIG. 1 is a structural explanatory view showing a solid state laser device 100 according to a first embodiment. The solid state laser device 100 includes a laser diode 1, a condensing lens 2, an Nd:YAG laser medium 3, a non-linear optical element 4, an etalon 5, an output mirror 6, a beam splitter 8 and a laser diode driving circuit 9. The laser diode 1 outputs an excited laser beam Le. The condensing lens 2 condenses the excited laser beam Le to the Nd:YAG laser medium 3. The Nd:YAG laser medium 3 is excited by the excited laser beam Le to induce and emit a fundamental wave. The non-linear optical element 4 converts the fundamental wave to a higher harmonic wave. The etalon 5 changes a longitudinal mode to a single mode. The output mirror 6 forms one end of an optical resonator 7 to transmit the outputted laser beam Lo. The beam splitter 8 takes out a part of the outputted laser beam Lo. The laser diode driving circuit 9 drives the laser diode 1.

Further, the solid state laser device 100 includes a light receiving element 11, a controller 12, an optical resonator temperature regulator 21, an etalon temperature regulator 22, a first temperature regulator driving circuit 23 and a second temperature regulator driving circuit 24. The light receiving element 11 receives the laser beam taken out by the beam splitter 8. The controller 12 controls the laser diode 1 through the laser diode driving circuit 9 so that a light receiving intensity in the light receiving element 11 is constant. The optical resonator temperature regulator 21 heats or cools the entire part of the optical resonator 7. The etalon temperature regulator 22 heats or cools the etalon 5. The first temperature regulator driving circuit 23 drives the optical resonator temperature regulator 21 under the control of the controller 12. The second temperature regulator driving circuit 24 drives the etalon temperature regulator 22 under the control of the controller 12.

Figure 2:
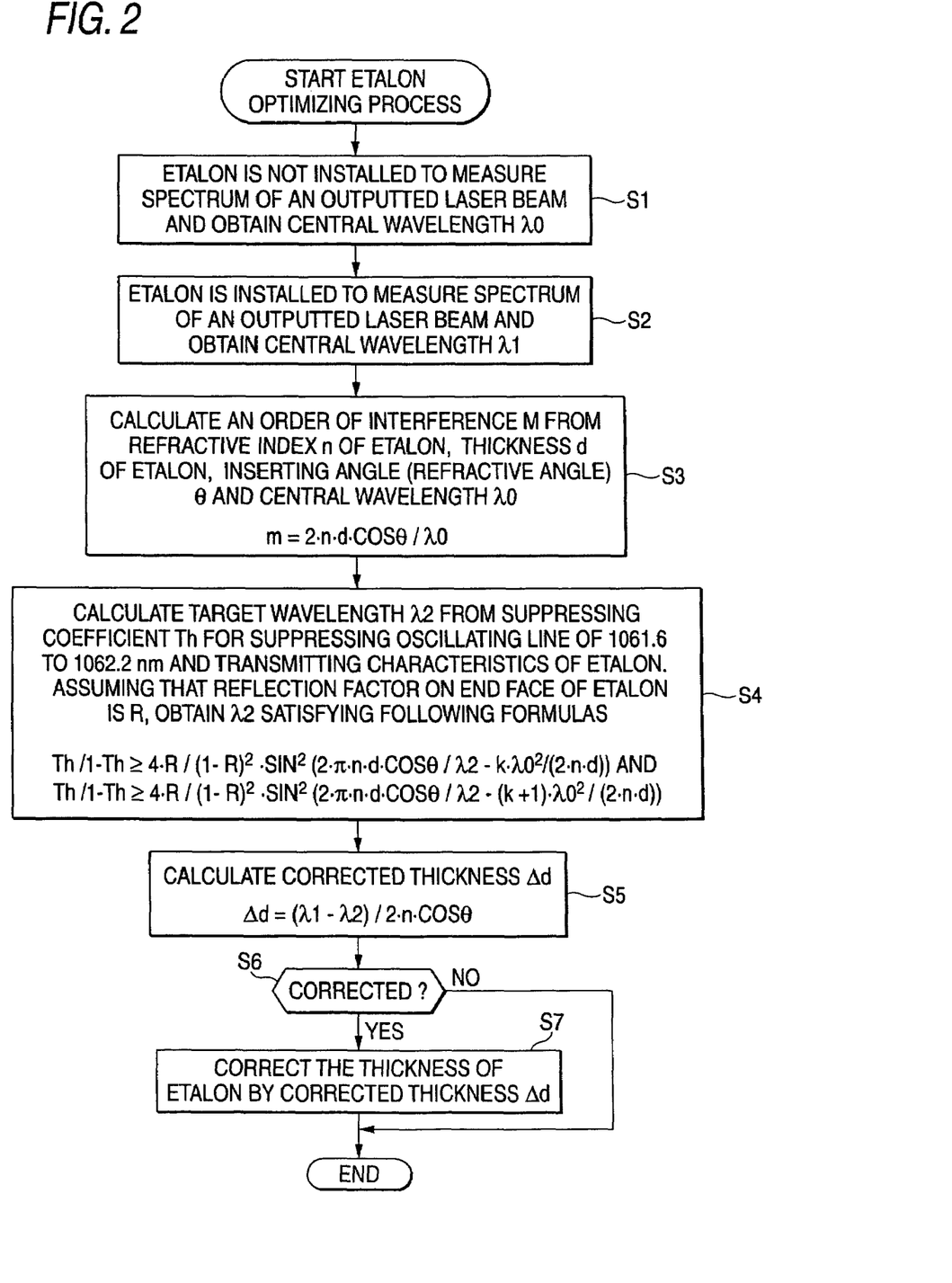
FIG. 2 is a flow diagram showing an etalon optimizing process according to the first embodiment.

FIG. 2 is a flow diagram showing an etalon optimizing process carried out when the solid state laser device 100 is produced.

In step S1, the spectrum of the outputted laser beam Lo is measured in a structure having no etalon 5 installed. Then, the central wavelength λ0 of the oscillating line having the wavelength of 1064.2 to 1065.2 nm is obtained. For instance, the spectrum of the second harmonic wave as shown in FIG. 3 is measured and the wavelength of a maximum peak is doubled to consider an obtained value to be the central wavelength λ0.

In step S2, the spectrum of the outputted laser beam Lo is measured in the structure having the etalon 5 installed. Then, the central wavelength λ1 of the oscillating line having the wavelength of 1064.2 to 1065.2 nm is obtained. For instance, the spectrum of the second harmonic wave as shown by a thick full line in FIG. 4 is measured and the wavelength of a maximum peak is doubled to consider an obtained value to be the central wavelength λ1.

In step S3, an order of interference m of the etalon 5 relative to a fundamental wave by the oscillating line having the wavelength of 1064.2 to 1065.2 nm is calculated from the refractive index n of the etalon 5, a thickness d, an inserting angle (refractive angle) θ and the central wavelength λ0.

$$m = 2 \cdot n \cdot d \cdot \cos \theta / \lambda 0$$

In step S4, when a new central wavelength is a target wavelength λ2, assuming that the order of interference of the etalon 5 relative to the fundamental wave of the oscillating line having the wavelength of 1064.2 to 1065.2 nm by the Nd:YAG laser medium 3 is m and an integer not smaller than 0 and not larger than 3 is k, the target wavelength λ2 is obtained from a transmittance Th and the transmitting characteristics of the etalon 5, which satisfies a condition that the oscillating line having the wavelength of 1061.6 to 1062.2 nm by the Nd:YAG laser medium 3 is located within a range having the transmittance Th not higher than 0.9 between the maximum transmittance peak of the order of interference m+k of the etalon 5 and the maximum transmittance peak of the order of interference m+k+1. Specifically, assuming that a reflection factor on the end face of the etalon 5 is R, λ2 satisfying following formulas is obtained.

$$Th/1-Th \geq 4 \cdot R/(1-R)^2 \cdot \sin^2(2 \cdot \pi \cdot n \cdot d \cdot \cos \theta / \lambda 2 - k \cdot \lambda 0^2/(2 \cdot n \cdot d)) \quad \text{[Mathematical Formula 1]}$$

$$Th/1-Th \geq 4 \cdot R/(1-R)^2 \cdot \sin^2(2 \cdot \pi \cdot n \cdot d \cdot \cos \theta / \lambda 2 - (k+1) \cdot \lambda 0^2/(2 \cdot n \cdot d)) \quad \text{[Mathematical Formula 2]}$$

In step S5, corrected thickness Δd is calculated.

$$\Delta d = (\lambda 1 - \lambda 2) / 2 \cdot n \cdot \cos \theta$$

In step S6, when the corrected thickness Δd is a suitable value (not excessively small or not excessively large), the procedure advances to step S7. When the corrected thickness Δd is not a suitable value (excessively small or excessively large), the process is finished.

In the step S7, the thickness of the etalon 5 is corrected by the corrected thickness Δd. The etalon 5 is cut by a technique disclosed in, for instance, US2003/0146189A1. Then, the process is finished.

Figure 5:
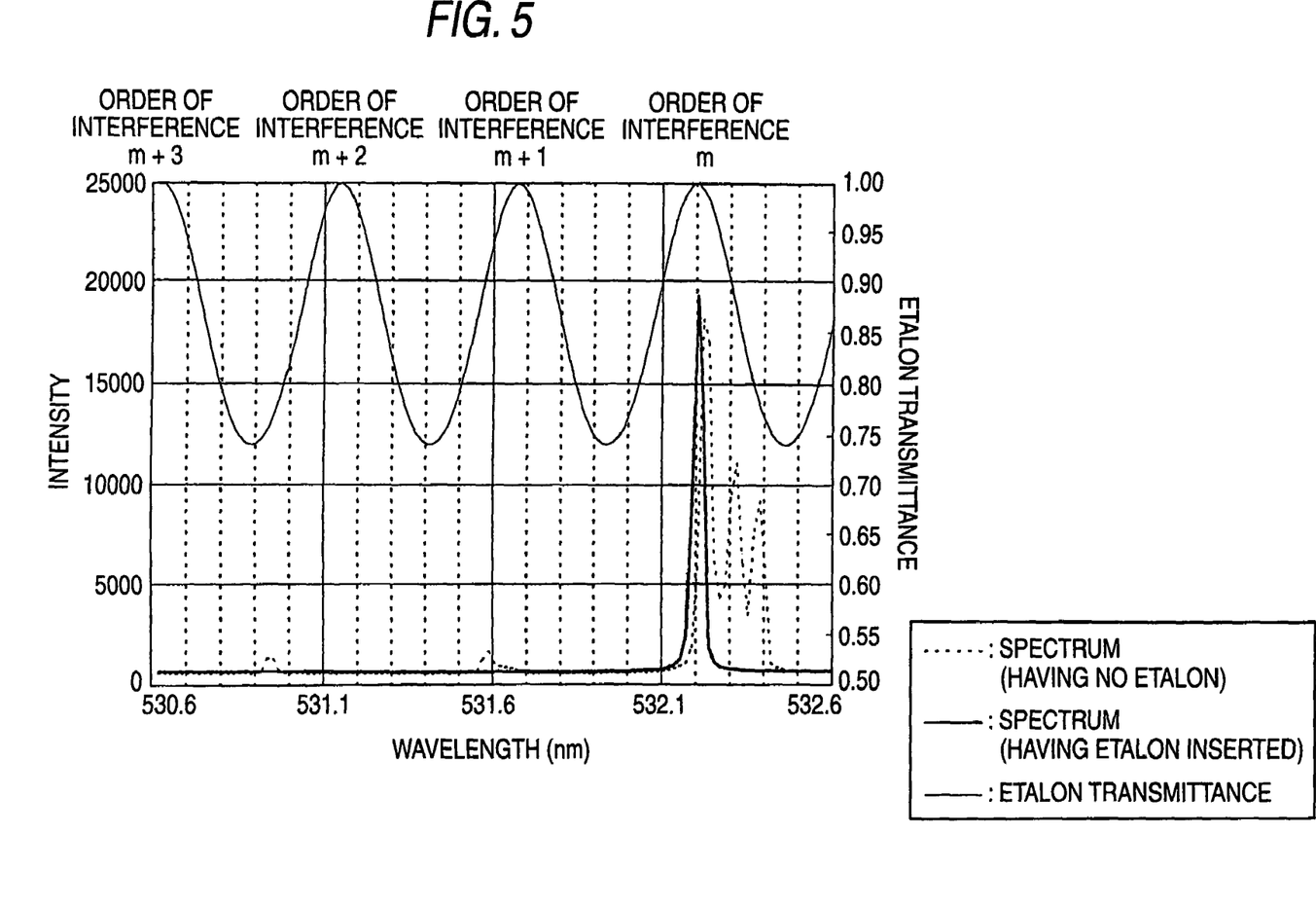
FIG. 5 is a graphical diagram showing the transmitting characteristics of the etalon and the spectrum of the outputted laser beam in a structure into which the etalon after the optimizing process is inserted in the first embodiment.

The spectrum of the outputted laser beam Lo of the solid state laser device 100 having a structure that the corrected etalon 5 is installed is illustrated in FIG. 5.

When the order of interference of the maximum transmittance peak corresponding to the main oscillating line having the wavelength of 1064.2 to 1065.2 nm is m, a secondary oscillating line having the wavelength of 1061.6 to 1062.2 nm corresponds to a minimum transmittance peak between an order of interference m+2 and an order of interference m+3, so that a secondary peak of the wavelength of 530.8 to 531.1 nm does not appear in the outputted laser beam Lo. Further, a secondary peak of the wavelength of 531.4 to 531.8 nm does nto appear. That is, the longitudinal mode can be preferably changed to the single mode and a stable output can be obtained.

Now, the grounds of the above-described "Mathematical Formula 1" and the "Mathematical Formula 2" are described below.

Wavelength difference FSR between the order of interference m and the order of interference m+1 is expressed by a following equation.

$$FSR = \lambda 0^2 / (2 \cdot n \cdot d)$$

Wavelength difference Δλ (k) between the order of interference m and the order of interference m+k is expressed by a following equation.

$$\Delta \lambda(k) = k \cdot FSR$$

Wavelength difference Δλ (k+1) between the order of interference m and the order of interference m+k+1 is expressed by a following equation.

$$\Delta \lambda(k+1) = (k+1) \cdot FSR$$

Phase difference parameter (phase difference generated by the multiple reflection of the etalon 5) δ (k) of the order of interference m+k is expressed by a following equation.

$$\delta(k) = 4 \cdot \pi \cdot n \cdot d \cdot \cos \theta / (\lambda - \Delta \lambda(k))$$

Phase difference parameter (phase difference generated by the multiple reflection of the etalon 5) δ (k+1) of the order of interference m+k+1 is expressed by a following equation.

$$\delta(k+1) = 4 \cdot \pi \cdot n \cdot d \cdot \cos \theta / (\lambda - \Delta \lambda(k+1)).$$

Transmittance T(k) of the etalon 5 relative to the order of interference m+k is expressed by a following equation.

$$A = 4 \cdot R \cdot \sin^2 (\delta(k)/2)/(1-R)^2$$

$$T(k) = A/(1+A)$$

Transmittance T(k+1) of the etalon 5 relative to the order of interference m+k+1 is expressed by a following equation.

$$B = 4 \cdot R \cdot \sin^2(\delta(k+1)/2)/(1-R)^2$$

$$T(k+1) = B/(1+B)$$

Wavelength λ that satisfies $T(k) \leq Th$ and $T(k+1) \leq Th$ is target λ2.

Second Embodiment

Figure 6:
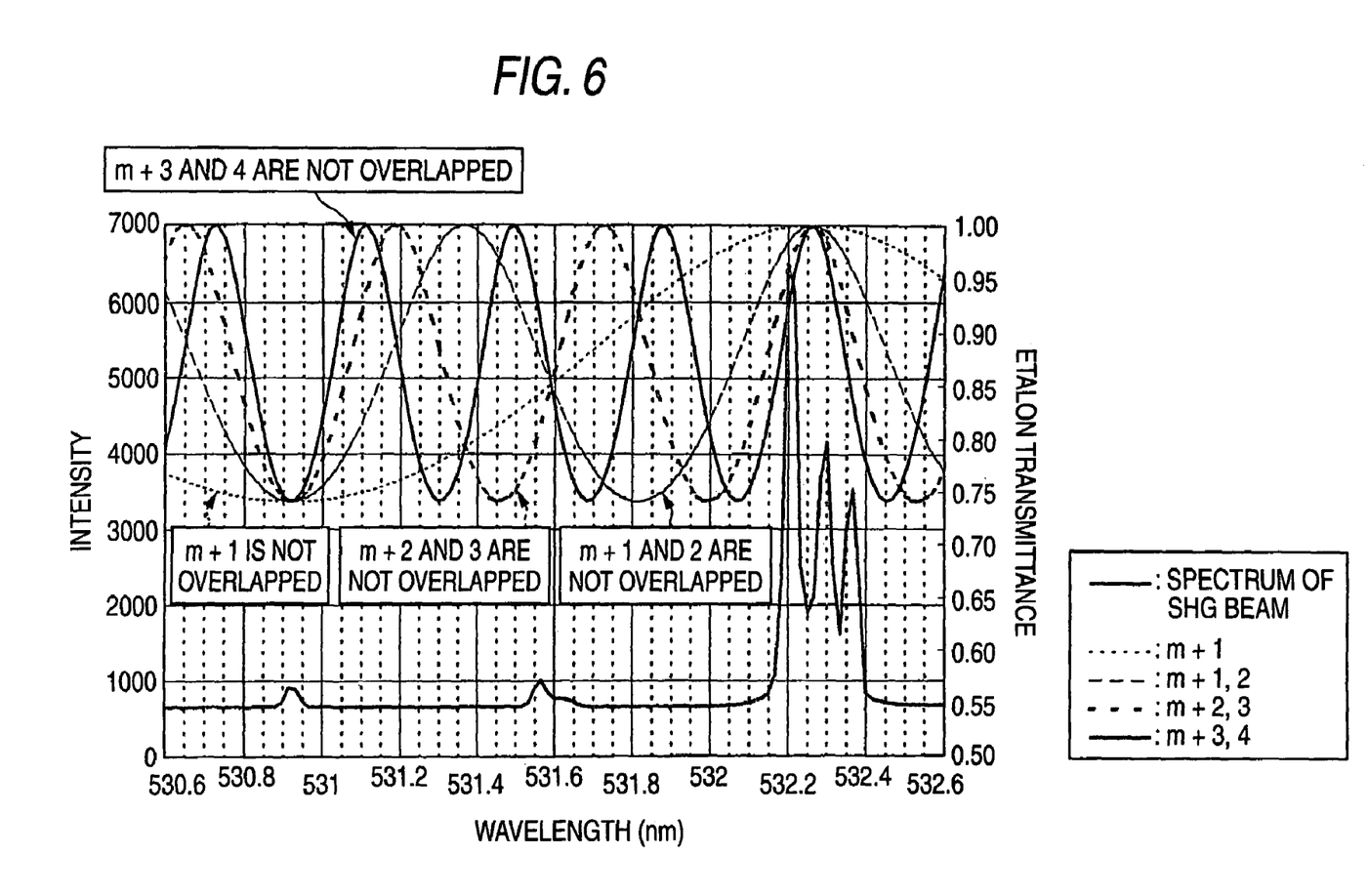
FIG. 6 is a graphical diagram showing the transmitting characteristics of various kinds of etalons after an optimizing process and the spectrum of an outputted laser beam in a structure having the etalon removed in a second embodiment.

As shown by a thin dotted line in FIG. 6, an etalon 5 may be employed in which a secondary oscillating line having the wavelength of 1061.6 to 1062.2 nm corresponds to a minimum transmittance peak between an order of interference m and an order of interference m+1.

Further, as shown by a thin broken line in FIG. 6, an etalon 5 may be employed in which a secondary oscillating line having the wavelength of 1061.6 to 1062.2 nm corresponds to a minimum transmittance peak between an order of interference m+1 and an order of interference m+2.

Further, as shown by a thick full line in FIG. 6, an etalon 5 may be employed in which a secondary oscillating line having the wavelength of 1061.6 to 1062.2 nm corresponds to a minimum transmittance peak between an order of interference m+3 and an order of interference m+4.

A thick broken line in FIG. 6 shows the transmitting characteristics of the etalon 5 described in the first embodiment.

The solid state laser device and the method for producing the solid state laser device can according to the present invention can be utilized in a bio-engineering field or a measurement field.

I claim:

1. A method of producing a solid state laser device including a laser diode for outputting an excited laser beam; an Nd:YAG laser medium excited by the excited laser beam to induce and emit a fundamental wave; a non-linear optical element for converting the fundamental wave to a higher harmonic wave; an etalon for changing a longitudinal mode to a single mode; and an output mirror forming one end of an optical resonator and transmitting the outputted laser beam, said producing method for a solid state laser device comprising the steps of:

observing the outputted laser beam of the solid state laser device to measure a central wavelength $\lambda1$ of an oscillating line having the wavelength of 1064.2 to 1065.2 nm by the Nd:YAG laser medium;

observing the outputted laser beam of the solid state laser device having the etalon removed to measure a central wavelength $\lambda0$ of an oscillating line having the wavelength of 1064.2 to 1065.2 nm by the Nd:YAG laser medium;

obtaining a corrected optical path length $\Delta$ of the etalon so that the transmittance of the etalon relative to an oscillating line having the wavelength of 1061.6 to 1062.2 nm by the Nd:YAG laser medium is 0.9 or lower on the basis of the $\lambda0$ and $\lambda1$; and correcting the optical path of the etalon by the corrected optical path length $\Delta$.

2. A method of producing a solid state laser device according to claim 1, wherein assuming that an order of interference of the etalon relative to the fundamental wave of the oscillating line having the wavelength of 1064.2 to 1065.2 nm by the Nd:YAG laser medium is m and an integer not smaller than 0 and not larger than 3 is k, the corrected optical path length $\Delta$ is obtained so that the oscillating line having the wavelength of 1061.6 to 1062.2 nm by the Nd:YAG laser medium is located within a range having the transmittance not larger than 0.9 between the maximum transmittance peak of the order of interference of m +k of the etalon and the maximum transmittance peak of the order of interference of m+k+1.

3. A method of producing a solid state laser device including a laser diode for outputting an excited laser beam; an Nd:YAG laser medium excited by the excited laser beam to induce and emit a fundamental wave; a non-linear optical element for converting the fundamental wave to a higher harmonic wave; an etalon for changing a longitudinal mode to a single mode; and an output mirror forming one end of an optical resonator and transmitting the outputted laser beam, said producing method for a solid state laser device comprising the steps of:

observing the outputted laser beam of the solid state laser device to measure a central wavelength $\lambda1$ of an oscillating line having the wavelength of 1064.2 to 1065.2 nm by the Nd:YAG laser medium;

observing the outputted laser beam of the solid state laser device having the etalon removed to measure a central wavelength $\lambda0$ of an oscillating line having the wavelength of 1064.2 to 1065.2 nm by the Nd:YAG laser medium;

obtaining a corrected thickness $\Delta d$ of the etalon so that the transmittance of the etalon relative to an oscillating line having the wavelength of 1061.6 to 1062.2 nm by the Nd:YAG laser medium is 0.9 or lower on the basis of the $\lambda0$ and $\lambda1$; and correcting the thickness of the etalon by the corrected thickness $\Delta d$.

4. A method of producing a solid state laser device according to claim 3, wherein assuming that an order of interference of the etalon relative to the fundamental wave of the oscillating line having the wavelength of 1064.2 to 1065.2 nm by the Nd:YAG laser medium is m and an integer not smaller than 0 and not larger than 3 is k, the corrected thickness $\Delta d$ of etalon is obtained so that the oscillating line having the wavelength of 1061.6 to 1062.2 nm by the Nd:YAG laser medium is located within a range having the transmittance not larger than 0.9 between the maximum transmittance peak of the order of interference of m +k of the etalon and the maximum transmittance peak of the order of interference of m+k+1.

* * * * *

UNITED STATES PATENT AND TRADEMARK OFFICE
CERTIFICATE OF CORRECTION

| | | |
|---|---|---|
| PATENT NO. | : 7,382,812 B2 | |
| APPLICATION NO. | : 11/250846 | |
| DATED | : June 3, 2008 | |
| INVENTOR(S) | : Irikuchi | |

It is certified that error appears in the above-identified patent and that said Letters Patent is hereby corrected as shown below:

In the Drawings, Sheet 3 of 6, delete "Fig. 3" and insert the attached Fig. 3.

Signed and Sealed this

Second Day of September, 2008

JON W. DUDAS
*Director of the United States Patent and Trademark Office*